United States Patent [19]
Mattes et al.

[11] Patent Number: 4,579,098
[45] Date of Patent: Apr. 1, 1986

[54] METHOD OF AND DEVICE FOR CONTROLLING THE BURN-OFF OF A MEASURING RESISTOR

[75] Inventors: Bernhard Mattes, Sachsenheim; Egbert Perenthaler, Stuttgart; Günther Plapp, Filderstadt, all of Fed. Rep. of Germany

[73] Assignee: Robert Bosch GmbH, Stuttgart, Fed. Rep. of Germany

[21] Appl. No.: 713,576

[22] Filed: Mar. 19, 1985

Related U.S. Application Data

[63] Continuation of Ser. No. 555,692, Nov. 28, 1983, abandoned.

[30] Foreign Application Priority Data

Dec. 16, 1982 [DE] Fed. Rep. of Germany ....... 3246523

[51] Int. Cl.⁴ ..................... F02P 17/00; F02P 19/02
[52] U.S. Cl. ......................................... 123/494; 73/35
[58] Field of Search .............. 123/490, 42 J, 478, 123/143 A, 143 R; 73/35, 346, 204; 350/96.1, 96.11, 96.12, 96.13, 96.14, 96.15

[56] References Cited

U.S. PATENT DOCUMENTS

| | | | |
|---|---|---|---|
| 3,533,381 | 10/1970 | Schmid et al. | 123/494 |
| 3,796,198 | 3/1974 | Mauch et al. | 123/494 |
| 4,058,089 | 11/1977 | Schmidt et al. | 123/494 |
| 4,334,186 | 6/1982 | Sasayama et al. | 123/494 |
| 4,397,283 | 8/1983 | Komaroff et al. | 73/3 J |

FOREIGN PATENT DOCUMENTS 0119925  9/1980  Japan ................................. 123/494

Primary Examiner—Raymond A. Nelli
Attorney, Agent, or Firm—Michael J. Striker

[57] ABSTRACT

Disclosed is a method of and a device for controlling a burn-off function of a measuring resistor, particularly heated wire or heated film in an air flow sensor of an internal combustion engine. The burn-off operation for fast cleaning the measuring resistor is normally made either periodically or in response to preset operational conditions of the engine. The invention interrupts this burn-off function when detrimental operational condition of the engine depending on the rotary speed has occurred. The stoppage of the burn-off function preferably occurs after a simultaneous detection of a predetermined temperature value detected by a sensor.

9 Claims, 4 Drawing Figures

METHOD OF AND DEVICE FOR CONTROLLING THE BURN-OFF OF A MEASURING RESISTOR

This application is a continuation of application Ser. No. 555,692, filed Nov. 28, 1983, now abandoned.

BACKGROUND OF THE INVENTION

This invention relates in general to a method of and a device for controlling the burn-off self-cleaning function of a measuring resistor, such as a heating wire serving for measuring purposes in an internal combustion engine. In particular, this invention relates to a method of and a device for stopping the burning of the resistor under predetermined operational conditions of the engine.

In internal combustion engines used especially in motor vehicles, there is known an air flow sensor including a measuring resistance in the form of a heated wire which after each turning off of the engine is sparked with electric current in order to burn off all of the deposited polluting particles. This is achieved by unbalancing a bridge circuit in which the heated wire forms a branch. It is true that such a repeated burn-off leads to satisfactory results nevertheless the service life of heated wires is impaired.

It has also been found that in air flow meters equipped with heated wires which are subject to frequent burn off at relatively low temperatures, only organic polluting particles can be burned off, whereas the deposition of silicate glasses from ambient dust and the like which may cause gradual impairment of measuring results, is not prevented. On the other hand, however, such silicate glass particles when subject to high temperature from the heated wire may become melted away. To this end burn off processes are known which are dependent either on operational parameters of the engine and can be performed during different time periods.

A problem occurring generally in known burn-off processes of such hot wires is the fact that a catalytic burn-off of the same wire will result. The catalytic burn-off can occur under certain operational conditions of the engine, for example after the engine is shut down and its rotary speed drops below 2000 RPM or 300 RPM. In this case, fuel vapors due to pulsations of the air column in the intake manifold reach the hot wire sensor. As a consequence the cleaning burn-off process can initiate the so called catalytic burning of the fuel vapors on the hot wire. The burning fuel releases a considerable amount of additional heat resulting in over heating of the wire sensor above the temperate limit originally set by the increased electric current needed for the cleaning burn-off process. The over heated wire sensor starts acting as a catalyser and the catalytic burning can continue even if the heating electrical current is disconnected.

Such over heating of the wire damages the same due to evaporation, oxidation, melting and dimensional changes of wire material. In other words, the term "catalytic burning" denotes a detrimental overheating of the wire sensor because of burning of fuel vapors intruding in the intake manifold at certain rotary speeds of the engine.

SUMMARY OF THE INVENTION

It is, therefore, a general object of the present invention to overcome the aforementioned disadvantage.

More particularly it is an object of the invention to provide an improved method of a device for controlling the burn-off of hot wires employed as measuring resistances especially in the form of air flow sensors in internal combustion engines, by means of which a catalytic burning of the wires is effectively prevented.

In keeping with this object and others which will become apparent hereafter, one feature of the invention resides in the method of this invention in stopping the burn-off function by means of an electronic control circuit in response to a predetermined rotary speed of the engine at which catalytic burning of the measuring resistor would occur.

The electronic burn-off control circuit includes at least one timing member controlled by a rotary speed sensor to detect the predetermined rotary speed of the engine, a bistable storing device coupled to the timing member to deliver an output signal when the predetermined speed is detected, the storing device being coupled to a burn-off start/stop circuit to stop the burn-off function in response to the output signal and hence to a predetermined rotary speed of the engine.

By means of this invention, the important advantage is achieved that the catalytic burn-off of the hot wire itself is substantially eliminated when the burn-off operation is subject to certain operational conditions of the engine at which, as found in practice, the hot wires are prone to become damaged due to the catalytic burning.

The invention makes it possible to determine accurately and substantially independently from the temperature a window in the rotary speeds at which such detrimental effects on the hot wires will occur and simultaneously enables the data storage of preceding operational conditions so as to stop the burn-off function before such detrimental operational conditions are encountered. In other words, the method of this invention insures that certain preliminary conditions known from the preceding measurements of the engine, such as a rotary speed exceeding a certain limit, are effectively prevented.

In the control device of this invention, means are provided for a simple and effective determination of the lower and upper rotary speed limit (speed window) by means of two monstable multivibrators cooperating with a subsequent latching or storing stage. This combination acts as a memory by means of which it is possible to determine the moment of stopping the burn-off function of the hot wires.

The novel features which are considered as characteristic for the present invention are set forth in particular in the appended claims The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The invention is based on the recognition that disadvantageous catalytic burn-off of heated wires in measuring devices when the latter are applied in internal combustion engines as air flow sensors, can be substantially avoided when certain conditions which will be explained below, are fulfilled. One of such conditions may be the absense of certain operational phases of the engine or the occurrence of a certain operational stage of the latter. If such conditions are detected, then the burn-off control circuit of this invention is designed such as to completely eliminate the burn-off function between the current pulses of increased current intensity generated in conventional manner to perform the burn-off function, are supressed and the burn-off or annealing of the heated wire is prevented.

According to this invention, the burn-off of heated wire is eliminated under the following conditions of the internal combustion engine:

1. When the rotary speed of the engine has not reached or exceeded a limit value n=2000 rotations per minute.

2. When a rotary speed n is or has been less than 300 rotations per minute, the ignition has been switched on (terminal 15 of a motor vehicle was connected to battery). This condition is equivalent to stalling of the engine.

3. When the engine temperature is below a limit temperature of $delta_m = 20° C$.

It has been found by experiment that catalytic burning of a heated wire due to the application of self-cleaning burn-off function or annealing is particularly intensified when the above conditions are met and consequently the prevention of the self cleaning burn-off function in such cases has altogether a definite influence on the service life of the heated wire in the air flow sensor of the engine.

Figure 1:
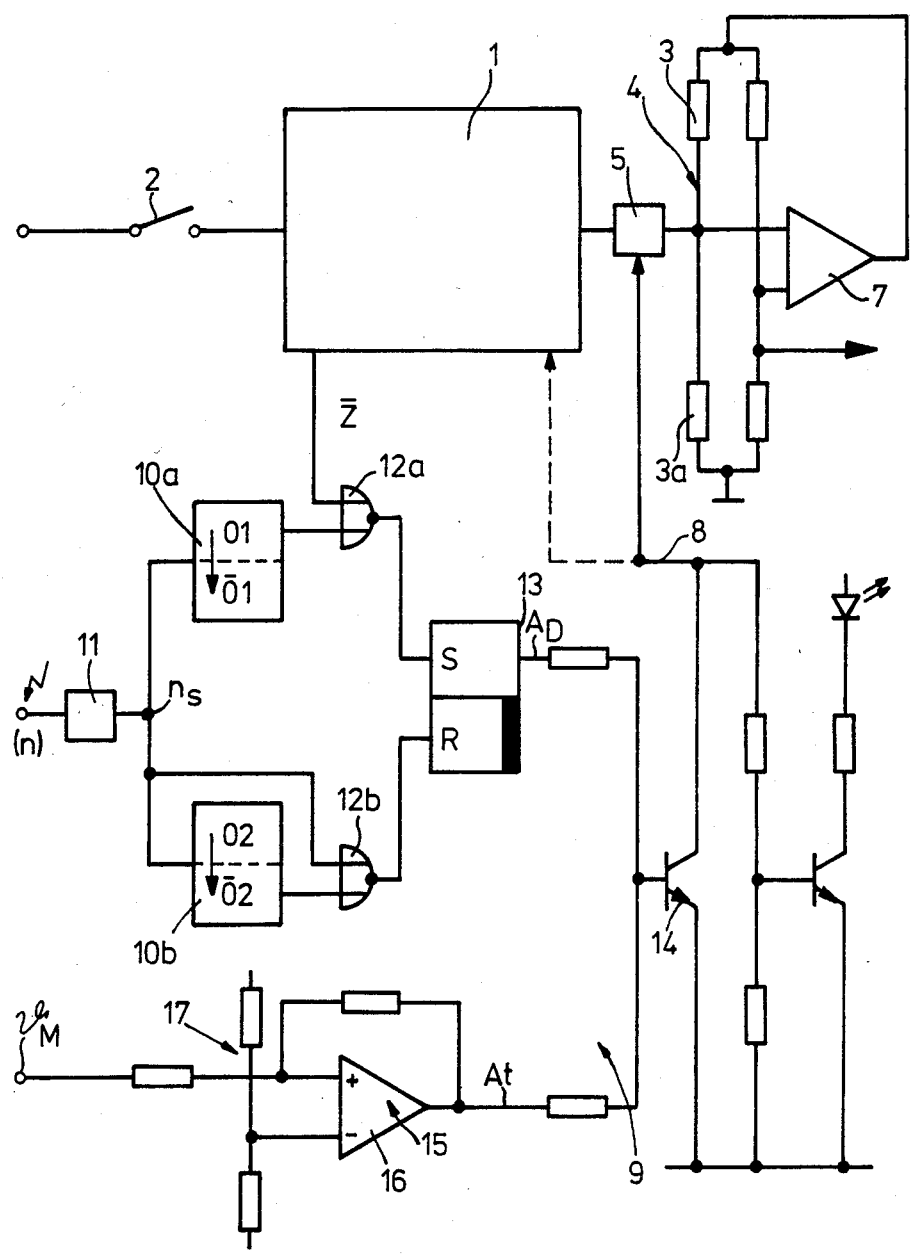
FIG. 1 shows a block circuit diagram of a control circuit for preventing the burn-off operation of a heated wire.

Electric circuit for controlling the self-cleaning burn-off function of the heated wire is illustrated in FIG. 1 by a block 1. Such circuits are known in the art and their constructions and operations need not be explained in detail for an understanding of this invention. In general, such burn-off control circuits 1 are most designed in such a manner that the burn-off of the hot wire occurs after the stopage of the engine, that means after turning off the ignition or starter switch. Normally a self-cleaning burn-off function would be initiated always in the case when after the stalling of the engine a new starting process is necessary and by turning back the ignition switch, an initial position for restart is taken up. According to the aforementioned condition 2, the burn-off function is prevented.

In FIG. 1 the ignition or starting switch is indicated by reference numeral 2. The bridge circuit 4 including a heated wire 3 is connected via a switch 5 to a conventional control circuit 1 for the burn-off operation. The bridge 4 is designed such that after the activation of one of the bridge resistors, the resistor 3a for example is short-circuited and the resulting unbalance of the bridge is amplified by amplifier 7 which is connected in the diagonal or zero voltage detecting branch of the bridge. The amplifier 7 thus produces such an increase of current flowing through the measuring resistor (heated wire) 3 where the latter is subject to a burn-off or annealing process. The known control circuit 1 determines the time point and different pressures at which the self-cleaning burn-off function is initiated and this known operation of circuit 1 is not the objective of this invention. According to this invention however there is provided a protective circuit arrangement 9 which via an output conduit 8 connected to the switch 5 stops the burn-off operation by controlling either the control circuit 1 itself or the switch 5. As will be described below, the protective circuit 9 is responsive to the aforementioned conditions 1-3 so as to stop the burn-off operation when these conditions are met.

For this purpose the protective circuit 9 includes two timing members 10a and 10b each being connected to a source of a rotary speed indicating signal and timed so as to detect a predetermined lower and upper value of the rotary speed. The timing members are preferably in the form of monostable multivibrators whose input is connected to the output of a pulse shaper 11, the latter being connected to a terminal to which a rotary speed signal, for example the ignition signal, is applied. One of the outputs of each monostable (or flip-flop) multivibrator 10a and 10b is connected to an input of assigned NOR-gates 12a or 12b. In this example, the NOR-gate 12a is connected to the noninverting output of timer 10a and its other input is connected to the control circuit 1. The other NOR-gate 12b has its one input connected to the inverting output of the multivibrator 10b and the other input of the NOR-gate is connected to the output of pulse shaper 11. The output of NOR-gate are connected to the set and reset inputs of a storage flip-flop 13 operating as a latching member. The output signal $A_B$ of the storage device 13 controls the end stage in the form of a transistor 14 of the protective device 9. This end stage is controlled also by a parallel connected pressure sensor 15 of the engine which generates at its output a signal $A_T$. This signal $A_T$ is high when the engine temperature measured for example by means of a sensor in cooling water of the engine, is smaller than a predetermined value, in this example when it is smaller than 20° C. The temperature sensor 15 is designed as a switching member in the form of an operational amplifier 16 with a feedback. The inverting input is supplied via a voltage divider 17 with a constant reference signal whereas the non-inverting input is supplied with the measured temperature signal $A_N$. The switchover of the output signal $A_T$ when the temperature approaches the value determined by the comparison reference signal thus occurs suddenly.

The function of the protective circuit 9 of FIG. 1 will be explained below in connection with time plot diagrams in FIG. 2.

Figure 3:
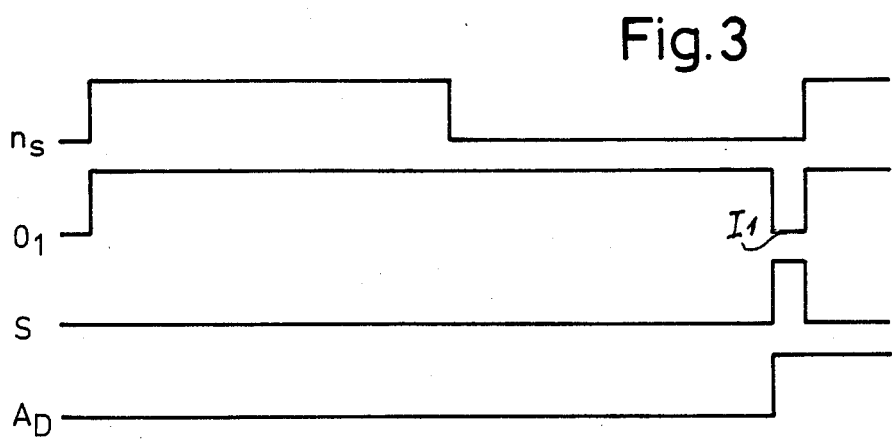

The monostable multivibrator 10a serves for detecting the aforementioned operational condition 2 occurring after the stalling of the engine. To this end, the interval of the transitory switching stage of the multivibrator 10a is adjusted so that at a given limit value of the rotary speed that means which is smaller than 300 rotations per minute (condition 2), be shorter than the duration of a rotation of the crank shaft. Referring now to FIG. 3, it will be seen that signal O1 from the corresponding output of the multivibrator 10a returns from its high value to the original state before a full period of the rotary speed signal $_nS$ is completed. In other words, since the monostable multivibrator 10a is triggered to change from its low stable state to its transitory high state by the rising flank of the rotary speed signal $_nS$ only, there results a short negative pulse I1 terminated by the subsequent rising flank of the signal O1 (FIG. 3). This negative pulse I1 is applied to the NOR-gate 12a to the S input of the latch 13. Rs flip-flop latching circuit is adjusted so that in the latter case a high output signal $A_B$ is produced at its non-inverting output. At the same time, the other input of NOR-gate 12a is supplied with a signal Z which, when the ignition switch 2 is turned off has a negative or logic zero value. A high output signal $A_B$ at the RS flip-flop 13 activates transistor 14 of the end stage of the protective circuit so that the transistor 14 becomes conductive and supplies via output conduit 8 a stop signal either to the control circuit 1 or to the switch 5. The stop signal in this example corresponds to logic zero or to the ground potential. As a consequence, the burn-off operation in the bridge circuit 4 is inhibited. In this example, the transistor 14 becomes conductive when both signals $A_D$ and $A_T$ are high and becomes switched off only when the two signals, namely the rotary speed signal $A_D$ and the engine temperature signal $A_T$ are broght to low value. This condition is fulfilled only when the engine temperature is more than 20° C. As soon as the motor temperature drops below the preset temperature value of 20° C., a high output signal $A_T$ occurs at the output of operational amplifier 16 and the burn-off function of the measuring resistor 3 is prevented.

Figure 4:
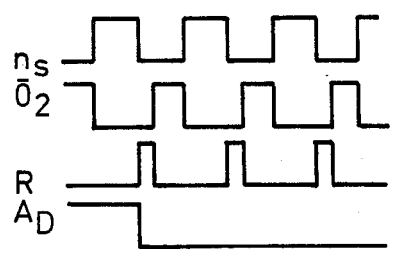

A further presumption for the release of the burn-off function is the condition 1 according to which the rotary speed value $_n=2000$ rotations per minute, must have been exceeded at least once. To detect this condition, the interval of the transitory state of the second monostable multivibrator 10b is adjusted such that it is longer than a half cycle of this rotary speed limit $_n$. Referring to the block diagram in FIG. 4, NS designates a rotary speed signal shaped as a train of rectangular pulses. O2 is a corresponding output signal of the multivibrator 10b. It is evident that the positive flank of the rotary speed signal $_nS$ has the output signal O2 to a low value. At relatively high rotary speed (greater than 2000 rotations per minute) the positive half waves of the rotary signals are shorter than the duration of the transitory state of the multivibrator 10b and consequently for a given time interval both the rotary speed signal and the output signal 02 of multivibrator 10b are simultaneously at a low value. After this time interval, a positive resetting pulse R is generated which is applied through the NOR-gate 12b to $_R$ input of the storing latch 13. The resetting pulse R changes the switching state of the storing latch 13 so that its output signal $A_B$ is low or at a zero potential.

Figure 2:
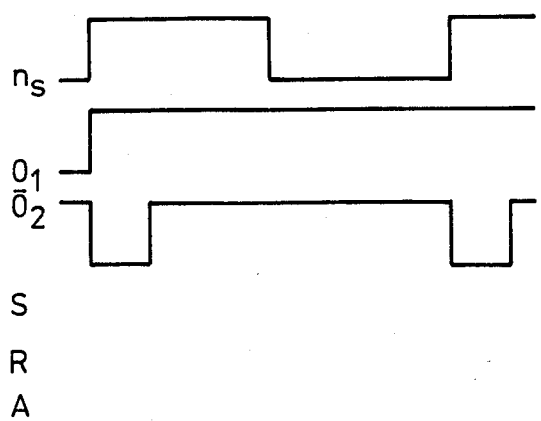
FIGS. 2–4 show time plots of switching conditions at different points in the circuit of FIG. 1.

The plot diagram in FIG. 2 shows the wave form of signals at rotary speeds between the two thresholds, that means between 300 rotations per minute $<n<2000$ rotations per minute. The duration of a half cycle or of a complete period of the rotary speed signal $n_S$ this case is such that the output signal O1 is triggered by the positive flank of the rotary speed signal $n_S$ and the signal O1 is held constantly at its high value, as a consequence that the setting signal S at the output of the NOR-gate 12a is applied to the S input of the storing flip-flop 13 always at a low value.

The other monostable multivibrator 10b returns to its stable state always before the end of the positive half wave of the rotary speed signal $n_s$ so that no time overlap of the low value of the rotary speed signal and of the output signal $\overline{O}_2$ at the NOR-gate 12b will occur. Accordingly, the reset signal R remains low and the output signal of the storing flip-flop circuit 13 remains unchanged. In the starting stage of the engine at which condition rotary speed rises from zero to a high value which of necessity is still below the lower rotary speed limit of 300 rotations per minute, the storing flip-flop 13 is triggered so that its output signal $A_D$ is high and prevents by turning on the end transistor 14 the release of the burn-off function by the control circuit 1. The output signal $A_D$ remains high until the upper limit of the rotary speed, namely 2000 rotations per minute are exceeded whereupon according to the plot diagram of FIG. 4, at least one resetting signal is generated, the transistor is switched off and the burn-off function of control circuit 1 is restarted. The circuit of this invention enables a very acurate setting of a rotary speed window which is substantially temperature independent and can store the threshold values by using very simple circuit design.

It will be understood that each of the elements described above, or two or more together, may also find a useful application in other types of constructions differing from the types described above.

While the invention has been illustrated and described as embodied in a specific example, it is not intended to be limited to the details shown, since various modifications and structural changes may be made without departing in any way from the spirit of the present invention.

Without further analysis, the foregoing will fo fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims:

1. A device for controlling the burn-off of a measuring resistor such as a heated wire or heated cell, particularly, for stopping the burn-off function of a control circuit for a measuring resistor arranged as an air mass flow sensor of an internal combustion engine, comprising means for producing a rotary speed signal, at least one timing member responsive to a predetermined limit value of the rotary speed signal to produce a trigger signal, storage means triggered by said trigger signal to generate an output signal applied to said burn-off control circuit for stopping its burn-off operation.

2. A device as defined in claim 1, comprising two timing members in the form of monostable multivibrators whose inputs are connected to the source of the rotary speed signal, said storage means being in the form of a RS flip-flop latch whose R and S inputs are connected via gating means to the corresponding outputs of said multivibrators, an end stage controlled by the output signal at said RS flip-flop between a conductive and non-conductive stage, the output of said end stage being connected to said control circuit for stopping or starting its burn-off function.

3. A device as defined in claim 1, further comprising a switching temperature sensor of the engine which after falling below or exceeding a preset temperature value switches over its output signal, the output signal of said temperature sensor being applied to said end stage where it is combined with the ouptut signal of the RS flip-flop to activate or inactivate the end stage and hence to stop or release the burn-off control circuit when the two signals are simultaneously applied to or removed from the end stage.

4. A device for controlling the burn-off of a measuring resistor such as a heated wire or heated cell, particularly for stopping the burn-off function of a cotnrol circuit for an air mass flow sensor of an internal combustion engine, comprising means for producing a rotary speed signal, at least one timing member responsive to a predetermined limit value of the rotary speed signal to produce a trigger signal, storage means triggered by said trigger signal to generate an output signal applied to said burn-off control circuit for stopping its burn-off operation, two timing members in the form of monostable multivibrators whose inputs are connected to the source of the rotary speed signal, said storage means being in the form of a RS flip-flop latch whose R and S inputs are connected via gating means to the corresponding outputs of said multivibrators, an end stage controlled by the output signal at said RS flip-flop between a conductive and non-conductive stage, the output of said end stage being connected to said control circuit for stopping or starting its burn-off function, and wherein the time interval of the non-stable state of a first monostable multivibrator is set shorter than the duration of a cycle of the rotary speed signal, the latter corresponding to a rotation of the engine to detect the drop below a lower value of the rotary speed signal in such a manner that in resetting the monostable multivibrator to its original state a setting pulse is generated for the subsequent storing RS flip-flop when ignition switch indicating signal Z simultaneously applied to the gating means and the time interval of the unstable state of the second monostable multivibrator is set to be longer than half wave of the rotary speed signal so that a reset pulse is applied to the RS storing flip-flop when the upper limit value of the rotary speed is exceeded.

5. A method of controlling the burn-off of a temperature measuring resistor such as a heated wire installed in the intake manifold of an internal combustion engine and connected to a source of measuring electric current, the engine being equipeed with means for performing in predetermined time intervals the burn-off function by heating the measuring resistor with an electric current of increased intensity with respect to the measuring electric current, comprising the steps of detecting a critical rotary speed value of the engine at which catalytic burning of the measuring resistor may occur, measuring rotary speed of the engine during operation of said means for performing the burn off function, and stopping the operation of said burn-off performing means by the aid of an electric protective circuit in response to the detection of said critical rotary speed value.

6. A method as defined in claim 5 wherein said measuring resistor is a part of an air-mass flow sensor installed in an intake manifold of the engine.

7. A method as defined in claim 5, wherein the burn-off function is interrupted when the temperature of the engine drops below 20° centigrade.

8. A method as defined in claim 5, wherein the burn-off function is stopped when a detected upper value of the rotary speed has not been exceeded since the last turn-on of the engine and/or at the turn on condition of the engine in which the ignition switch is on and the critical rotary speed of the engine has dropped below a detected lower value.

9. A method as defined in claim 8, and wherein a window defined by the lower rotary speed value and the upper rotary speed value is generated by means for two timing members whose outputs are coupled to a bistable storage device, the output signal of which determines the rotary speed window during which said burn-off function producing means remain unaffected.

* * * * *